Patented Oct. 25, 1932

1,884,809

UNITED STATES PATENT OFFICE

WILLIAM HENRY MOSS AND KENNETH H. CRUTCHFIELD, OF CUMBERLAND, MARYLAND, ASSIGNORS TO CELANESE CORPORATION OF AMERICA, A CORPORATION OF DELAWARE

LAMINATED GLASS AND METHOD OF MAKING SAME

No Drawing.    Application filed February 12, 1929.    Serial No. 339,398.

This invention relates to the preparation of laminated glass, and relates more particularly to a method of making such glass wherein sheets of plastic material containing derivatives of cellulose are coated with an adhesive and interposed between sheets of glass which have no adhesive coat thereon.

An object of our invention is to prepare laminated glass that is shatterless and whose component parts are well stuck by interposing adhesive coated sheets of plastic material containing derivatives of cellulose between sheets of glass that do not have a coat of adhesive. Other objects of our invention will appear from the following detailed description.

In the usual method of preparing laminated glass, the sheets of glass are coated with an adhesive and a sheet of plastic material is placed between the adhesive coated glass and the whole pressed at elevated temperatures, to cause lamination.

We have found that if instead of coating the sheets of glass with the adhesive, the sheets of plastic material containing derivatives of cellulose themselves are coated with adhesive and the same interposed between such sheets of glass, upon pressing at elevated temperature, a laminated glass may be formed, and this method presents many distinct advantages. The coating of the adhesive on the sheets of plastic material may be performed in the same establishment as that in which the sheets are prepared, and since such establishments are equipped to perform similar operations, the expense of lamination is materially reduced. Such coated sheets of plastic material may then be transported to the place where lamination is carried out.

If an adhesive containing inflammable volatile solvents is employed, such adhesive may be handled more readily at the place where the films or sheets of plastic material are prepared, since at these places suitable precautions for dealing with such inflammable solvents and for the recovery of the same are taken. Moreover in the prior process, it was necessary to perform two coating operations, one on each sheet of glass, whereas in the present process the single sheet of plastic material may be coated on both sides in one operation by passing such sheet through a solution of the adhesive. Often an adhesive is more adherent to glass than to the plastic sheet containing the derivative of cellulose, and it is a distinct advantage to apply the adhesive to the plastic sheet in the form of a solution to obtain better adhesion and then to laminate the same with the glass, whereupon good adhesion may be attained.

In accordance with our invention, we form laminated glass by coating a sheet or film made of a plastic material containing a derivative of cellulose on both sides thereof with a suitable adhesive, interposing such adhesive coated sheet between two sheets of uncoated glass and pressing at elevated temperature.

The cellulose derivatives employed in our invention may be inorganic derivatives of cellulose such as cellulose nitrate, but more particularly organic derivatives of cellulose such as organic esters of cellulose and cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose.

The sheets or films of plastic material containing the derivative of cellulose to be used in our invention may be prepared in any suitable manner. Thus these sheets may be formed by spreading a heavy but freely flowing solution of a derivative of cellulose in a volatile solvent onto a smooth surface, and after the evaporation of the volatile solvent, stripping the same from the smooth surface. If desired, the plastic sheet may be formed by kneading a mixture of a derivative of cellulose and suitable solvents to form a doughy mass, working such doughy mass on heated malaxating rolls, pressing the sheets formed by such rolls into a block, and planing sheets from such block. These sheets may also contain plastifiers such as triacetin, diethyl tartrate, dibutyl tartrate, camphor, diethyl phthalate, diphenylol propane, etc. In the preparation of these sheets any suitable volatile solvents, medium or high boiling solvents, etc., may be employed. If desired, stabilizers such as urea, and dyes and/or pigments, especially those of a violet or blue tint opposed to yellowness, may be incorporated in the plastic sheets.

The glass employed in making the laminated glass may be any blown, plate, drawn or any other glass that is suitable for use in automibile wind-shields and windows, windows in railroad cars or in any other places where laminated glass is desired.

The sheets of plastic material to be laminated may be coated on both surfaces with a layer of a suitable adhesive material. This adhesive may contain gelatin when cellulose nitrate is employed, or polymerized vinyl acetate, but preferably is in the form of a solution of a synthetic resin that is compatible with the derivative of cellulose employed in making the plastic sheet dissolved in a suitable volatile organic solvent. Examples of such synthetic resins are the fusible and soluble phenol-aldehyde resins prepared in the presence of an acid catalyst, diphenylol propane-formaldehyde resins, toluene sulfonamid-formaldehyde resins, the resins prepared by heating lactic acid under reflux, etc. Preferably these synthetic resins are dissolved together with an amount of a derivative of cellulose which is preferably the same as that employed in the plastic sheets. The formation and application of such adhesive coating compositions are more fully described in applications Nos. 313,961, 313,962, 313,963, 313,964 and 313,965, filed October 20, 1928.

The adhesive coating composition may be applied to the sheet or film containing the derivative of cellulose in any suitable manner, such as by brushing or spraying such sheets with the adhesive or by dipping or conveying the sheet of plastic material through a bath of such adhesive coating composition. The latter process presents the advantage of coating both surfaces of such sheets simultaneously. After the application of the adhesive to the sheets, the adhesive is permitted to dry at suitable temperatures. Thus it may dry at 50° C. for 15 minutes, or at any other suitable temperature for from a few minutes to 24 hours or more, as desired. If desired, a substantial proportion of a softener or plastifier may be added to the adhesive solution for use in this manner, so that the lamination may take place at a lower temperature, and with more ease than when an adhesive solution containing little or no softener is employed.

The adhesive coated sheets or films of the derivative of cellulose may then be interposed between uncoated sheets of glass, and the same pressed at elevated temperature to form a well stuck laminated glass. This laminating process may be carried out at the same place where the sheets of plastic material are coated, or it may be performed at some other and remote place.

Instead of employing only one sheet or film of a derivative of cellulose between two sheets of glass, two, three or more sheets or films of plastic material containing the derivative of cellulose may be placed between two sheets of glass, and the same pressed at elevated temperature until the plurality of sheets of plastic material form one layer. The surfaces between the plurality of sheets of plastic material may or may not be coated with an adhesive.

While ordinary derivatives of cellulose may be employed for making the plastic sheets, from the point of view of light-fastness we prefer to use specially purified derivatives of cellulose. The derivatives of cellulose, such as cellulose acetate, may be purified by careful and thorough filtration of solutions of the same as described in application 313,966 filed October 20, 1928, or by treating the same in solid form or in solution with oxidizing agents such as nitric acid, hydrogen peroxide, a hypochlorite, a permanganate or a dichromate aqueous solution, as described in the applications Nos. 313,968 filed October 20, 1928, or 334,353 filed January 22, 1929.

In order further to illustrate our invention but without being limited thereto the following specific examples are given.

Example I

The following is an example of a coating composition containing a derivative of cellulose dissolved in a volatile solvent that may be used for making films or sheets by flowing the same onto a smooth surface.

| | Parts by weight |
|---|---|
| Cellulose acetate | 20 |
| Acetone | 100 |

If desired, the cellulose acetate may be replaced in whole or in part by cellulose propionate or cellulose butyrate.

Example II

The following is another example of a suitable coating composition that may be used for making sheets or films for lamination:

| | Parts by weight |
|---|---|
| Cellulose acetate | 20 |
| Triacetin | 10 |
| Acetone | 100 |

The cellulose acetate may be replaced by cellulose nitrate.

Example III

The following is an example of a suitable adhesive that may be employed for causing a sheet of plastic material containing a sheet of plastic material containing cellulose acetate to adhere to glass in lamination.

| | Parts by weight |
|---|---|
| Cellulose acetate | 2 |
| Compatible synethetic resin | 3 |
| Triacetin | 2 |
| Acetone | 50 |
| Alcohol | 25 |
| Benzene | 25 |
| Ethyl lactate | 5 |

The synethetic resin may be a fusible and soluble toluene sulfonamid-formaldehyde resin or it may be a fusible and soluble diphenylol propane-formaldehyde resin.

It is to be understood that the foregoing detailed description is given merely by illustration, and that many variations may be made therein without departing from the spirit of our invention.

Having described our invention, what we claim and desire to secure by Letters Patent is:

1. In the method of preparing laminated glass, the step of interposing between sheets of glass that are not coated with an adhesive at least one continuous sheet or film made of plastic material containing derivatives of cellulose, the sheet or film having only on the surfaces thereof a suitable adhesive containing a synthetic resin compatible with the derivative of cellulose.

2. In the method of preparing laminated glass, the step of interposing between sheets of glass that are not coated with an adhesive at least one continuous sheet or film made of plastic material containing organic derivatives of cellulose, the sheet or film having only on the surfaces thereof a suitable adhesive containing a synthetic resin compatible with the derivative of cellulose.

3. In the method of preparing laminated glass, the step of interposing between sheets of glass that are not coated with an adhesive at least one continuous sheet or film made of plastic material containing cellulose acetate, the sheet or film having only on the surfaces thereof a suitable adhesive containing a synthetic resin compatible with the derivative of cellulose.

4. The method of preparing laminated glass comprising interposing between sheets of glass that are not coated with an adhesive at least one continuous sheet or film made of a plastic material containing a derivative of cellulose, the sheet or film having only on the surfaces thereof a suitable adhesive containing a synthetic resin compatible with the derivative of cellulose, and then pressing at elevated temperatures.

5. The method of preparing laminated glass comprising interposing between sheets of glass that are not coated with an adhesive at least one continuous sheet or film made of a plastic material containing cellulose acetate, the sheet or film having only on the surfaces thereof a suitable adhesive containing a synthetic resin compatible with the derivative of cellulose, and then pressing at elevated temperatures.

6. Laminated glass having at least one continuous layer of a plastic material containing a derivative of cellulose interposed between at least two sheets of glass and being caused to adhere thereto by means of an adhesive containing a synthetic resin compatible with the derivative of cellulose that has been applied only to the surfaces of the layer of plastic material.

7. Laminated glass having at least one continuous layer of a plastic material containing cellulose acetate interposed between at least two sheets of glass and being caused to adhere thereto by means of an adhesive containing a synthetic resin compatible with the derivative of cellulose that has been applied only to the surfaces of the layer of plastic material.

In testimony whereof, we have hereunto subscribed our names.

WILLIAM HENRY MOSS.
KENNETH H. CRUTCHFIELD.